United States Patent
Arteaga et al.

(10) Patent No.: US 9,068,836 B2
(45) Date of Patent: Jun. 30, 2015

(54) REAL-TIME LOCATION INFORMATION SYSTEM USING MULTIPLE POSITIONING TECHNOLOGIES

(76) Inventors: Carlos Arteaga, Roswell, GA (US); Alberto Diaz, Alpharetta, GA (US)

( * ) Notice: Subject to any disclaimer, the term of this patent is extended or adjusted under 35 U.S.C. 154(b) by 1502 days.

(21) Appl. No.: 11/874,539

(22) Filed: Oct. 18, 2007

(65) Prior Publication Data

US 2009/0105950 A1    Apr. 23, 2009

(51) Int. Cl.

| | |
|---|---|
| *G01C 21/00* | (2006.01) |
| *G08B 21/00* | (2006.01) |
| *H04W 4/02* | (2009.01) |
| *H04W 4/20* | (2009.01) |
| *H04L 29/08* | (2006.01) |
| *G01C 21/20* | (2006.01) |

(52) U.S. Cl.
CPC .............. *G01C 21/00* (2013.01); *G01C 21/20* (2013.01); *H04W 4/02* (2013.01); *H04W 4/20* (2013.01); *H04L 67/18* (2013.01)

(58) Field of Classification Search
CPC ......... G01C 21/00; G01C 21/20; H04W 4/02; H04W 4/20; B60R 25/102
USPC ............... 701/1, 24, 200, 201, 206–208, 213, 701/408, 409, 516, 519, 520; 340/988–990, 340/993, 995.1, 995.17, 539.1, 539.11, 340/539.13–539.2, 539.22, 539.23, 539.25
See application file for complete search history.

(56) References Cited

U.S. PATENT DOCUMENTS

| | | | | |
|---|---|---|---|---|
| 6,327,533 | B1 * | 12/2001 | Chou ............................. | 701/207 |
| 6,567,005 | B2 * | 5/2003 | Curwen et al. .............. | 340/573.4 |
| 6,833,811 | B2 * | 12/2004 | Zeitfuss et al. ........... | 342/357.31 |
| 6,987,451 | B2 * | 1/2006 | McKeown et al. ............ | 340/541 |
| 6,998,987 | B2 * | 2/2006 | Lin ............................... | 340/573.1 |
| 7,049,965 | B2 * | 5/2006 | Kelliher et al. ............. | 340/572.4 |
| 7,081,814 | B2 * | 7/2006 | Kawabe et al. ........... | 340/539.25 |
| 7,295,119 | B2 * | 11/2007 | Rappaport et al. ......... | 340/572.4 |
| 7,598,855 | B2 * | 10/2009 | Scalisi et al. .............. | 340/539.13 |
| 7,821,391 | B2 * | 10/2010 | Gupta et al. ............. | 340/539.13 |
| 7,881,862 | B2 * | 2/2011 | Pei et al. ........................ | 701/432 |
| 7,945,614 | B2 * | 5/2011 | Ebata et al. .................... | 709/203 |
| 2003/0203730 | A1 * | 10/2003 | Wan et al. ................... | 455/404.2 |
| 2003/0214397 | A1 * | 11/2003 | Perkins et al. ................ | 340/524 |

(Continued)

OTHER PUBLICATIONS

"Geographic coordinate system", http://en.wikipedia.org/wiki/geographic_coordinate_system, 4 pages.

(Continued)

*Primary Examiner* — Jack W Keith
*Assistant Examiner* — Chuong P Nguyen

(57) ABSTRACT

Systems, methods and computer program products for tracking objects in an area of interest are described. According to an embodiment, an object is tracked as follows. First position information relating to the object is received from a first sensor and translated to a coordinate system of a map. The object is displayed on the map in accordance with the translated first position information. Second position information relating to the object is received from a second sensor, where the second sensor is based on a second positioning technology different from the first positioning technology. The second position information is translated to the coordinate system of the map, and the object is displayed on the map in accordance with the translated second position information. In an embodiment, other information relating to the object is also received from sensors.

14 Claims, 13 Drawing Sheets

(56) References Cited

U.S. PATENT DOCUMENTS

| | | | |
|---|---|---|---|
| 2003/0214410 A1* | 11/2003 | Johnson et al. | 340/573.4 |
| 2004/0066329 A1* | 4/2004 | Zeitfuss et al. | 342/357.07 |
| 2005/0075116 A1* | 4/2005 | Laird et al. | 455/456.3 |
| 2006/0028552 A1* | 2/2006 | Aggarwal et al. | 348/169 |
| 2006/0129308 A1* | 6/2006 | Kates | 701/200 |
| 2008/0098068 A1* | 4/2008 | Ebata | 709/206 |
| 2009/0002155 A1* | 1/2009 | Ma et al. | 340/539.25 |
| 2012/0280812 A1* | 11/2012 | Sheikman et al. | 340/539.13 |

OTHER PUBLICATIONS

"Spherical coordinate system", http://en.wikipedia.org/wiki/Spherical_coordinates, 4 pages.

"Cartesian coordinate system", http://en.wikipedia.org/wiki/cartesian_coordinate_system, 7 pages.

* cited by examiner

FIG. 13

REAL-TIME LOCATION INFORMATION SYSTEM USING MULTIPLE POSITIONING TECHNOLOGIES

BACKGROUND OF THE INVENTION

1. Field of the Invention

The present invention is generally directed to location information systems, and more particularly to location information systems that use multiple positioning technologies.

2. Background Art

Positioning technologies for determining the location of an object are well known. For example, the Global Positioning System (GPS) includes a constellation of orbiting satellites. A GPS receiver uses signals from these satellites to determine its location, speed/direction, and time.

Radar is another positioning technology that uses electromagnetic waves to identify the range, altitude, direction, and speed of both moving and fixed objects such as aircraft, ships, motor vehicles, weather formations, and terrain.

A variety of location-related applications exist that use such positioning technologies. For example, truck tracking systems exist which employ GPS technology to track trucks as they travel through the country.

However, a location-related application typically employs only a single positioning technology. The use of a single positioning technology is a disadvantage as it is subject to single point of failure outages. The use of a single positioning technology is also a disadvantage because it is often difficult for any given positioning technology to provide complete coverage of any given area of interest.

Existing location-related applications are also flawed because they do not inherently support the addition of other positioning technologies. For example, a GPS based application (such as the truck tracking example mentioned above) cannot easily be modified to add devices that are based on radio-frequency identification (RFID) positioning technology. Instead, such modification is typically only possible through a time consuming and costly system overhaul. Such inflexibility of existing location-related applications make them ill-suited for enterprises that must be able to adapt quickly and inexpensively to changes in mission and positioning technologies.

Therefore, what is needed are improved location information systems, methods and computer program products that are capable of employing multiple positioning technologies.

BRIEF SUMMARY OF THE INVENTION

The present invention is directed to system, method and computer program product embodiments for tracking objects in an area of interest. According to an embodiment, an object is tracked as follows. First position information relating to the object is received from a first sensor, where the first sensor is based on a first positioning technology. The first position information is translated to a coordinate system of a map, and the object is displayed on the map in accordance with the translated first position information. Then, as the object moves, second position information relating to the object is received from a second sensor. The second sensor is based on a second positioning technology, where the second positioning technology is different from the first positioning technology. The second position information is translated to the coordinate system of the map, and the object is displayed on the map in accordance with the translated second position information.

In an embodiment, other information relating to the object is also received from sensors. Such other information is displayed on the map proximate to the coordinates of the object.

In an embodiment, new sensors can be added. In an embodiment, the new sensors are based on positioning technologies different from those of the existing sensors. Addition of new sensors include programming. Such programming includes information sufficient to enable translation from coordinate systems of the new sensors to the coordinate system of the map.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIGS. 11-13 illustrate an example graphical user interface for defining a new alert, according to an embodiment of the invention.

Figure 1:
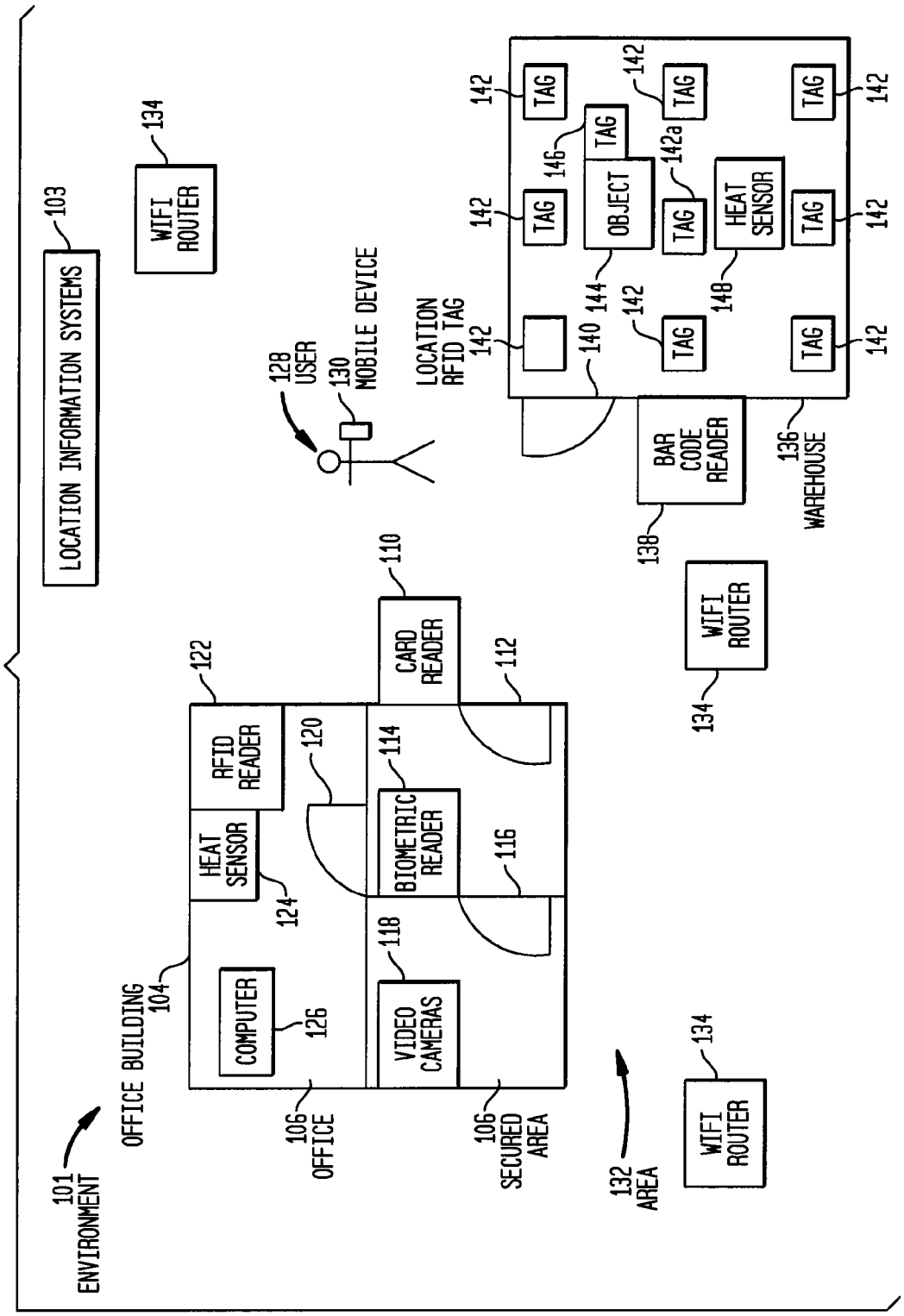
FIG. 1 illustrates a real-time location information system that uses multiple positioning technologies, according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Overview and Operational Example

The present invention is directed to system, method and computer program product embodiments for obtaining, translating, storing, mapping, displaying, querying and using location information. Embodiments of the invention employ multiple positioning technologies, including any combination of GPS, RFID, WLAN (802.11), bar code, biometric, video, computer and cellular technologies, although the invention is not limited to these examples. Instead, embodiments of the invention are applicable with any positioning technologies, existing now or developed in the future.

Embodiments of the invention are operable with sensors or other devices based on such positioning technologies. According to an embodiment, sensors based on any positioning technology can be easily added to the location systems of the invention.

These and other features of embodiments of the invention shall now be further described with reference to an example environment 101 shown in FIG. 1. This environment 101 includes an office building 104 and a warehouse 136 that are separated by an open area 132. A location information system 103 tracks and identifies the location of a user 128 as the user moves through the environment 101.

Figure 2:
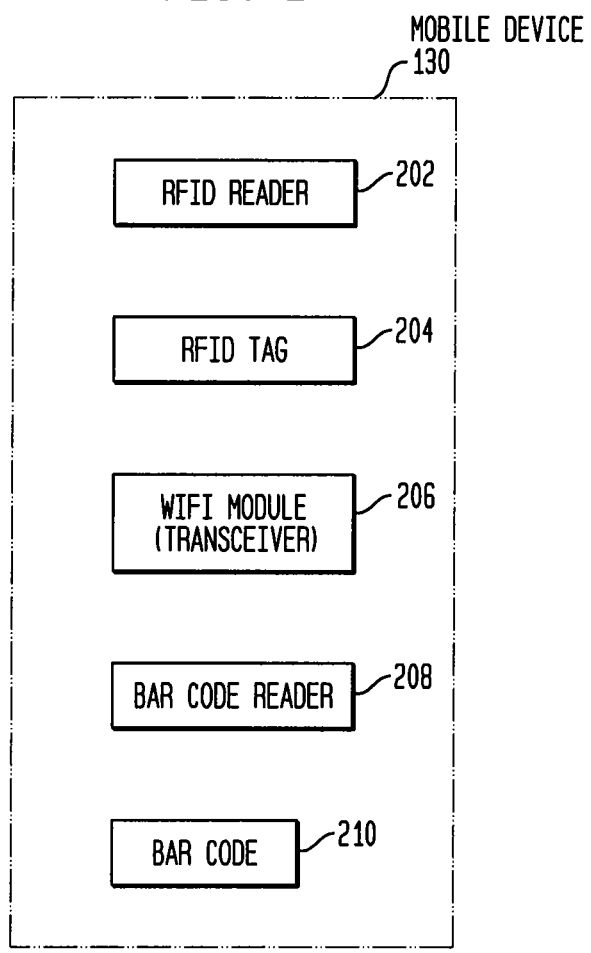
FIG. 2 is a mobile device used in an example real-time location information system, according to an embodiment of the invention.

In an embodiment, the user 128 carries a mobile device 130, an example of which is shown in FIG. 2. This example mobile device 130 includes a RFID Reader 202, RFID tag 204, WIFI module (transceiver) 206, bar code reader 208 and bar code 210, all of which are well known elements. More generally, mobile devices 130 may include any combination of these elements, as well as other elements the nature of which will be apparent to persons skilled in the relevant art(s) based on the teachings provided herein.

Figure 3:
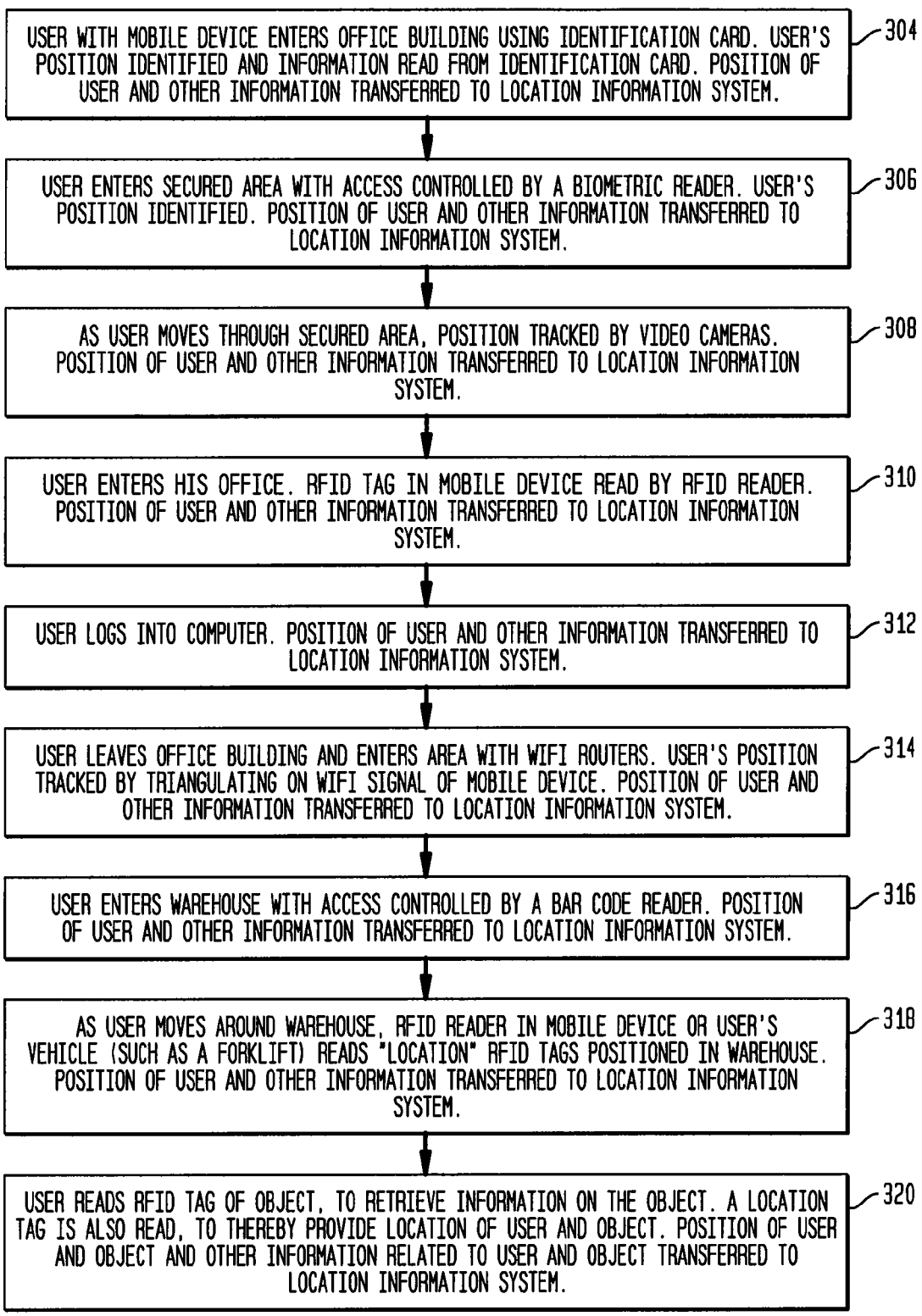
FIG. 3 is a flowchart illustrating how objects are tracked in an example real-time location information system, according to an embodiment of the invention.

The operation of location information system 103 as user 128 moves through environment 101 shall be described with reference to an example flowchart 302 shown in FIG. 3. In step 304, the user 128 with the mobile device 130 enters the office building 104 using an identification (ID) card. The ID card may or may not be integrated with the mobile device 130. A card reader 110 reads the ID card and, assuming the user 128 has appropriate clearance, the card reader 110 causes door 112 to open. According to an embodiment, card reader 110 sends information to location information system 103, where such information indicates that door 112 has been opened using user 128's ID card. (Such information may be sent by any wired or wireless means.) From this information, location information system 103 determines that user 128 is at door 112, and updates a map of the environment 101 with user 128's location.

In an embodiment, card reader 110 also sends to location information system 103 information read from the ID card. Such information read from the ID card may include, for example, the user 128's name, department, authorization level, height, weight, etc., or any combination thereof. In an embodiment, location information system 103 associates such information with user 128, and displays such information adjacent to user 128's location in the map of environment 101.

In step 306, user 128 uses a biometric reader 114 to gain access to a secured area 106. Biometric reader 114 may be any well known biometric device, such as a fingerprint scanner, eye scanner, voice analyzer, etc., or any combination thereof. Assuming user 128 has appropriate clearance, biometric reader 114 causes door 116 to open. According to an embodiment, biometric reader 114 sends a signal to location information system 103, where such signal indicates that door 116 has been opened based on a biometric scan that matches characteristics of user 128. From this signal, location information system 103 determines that user 128 is at door 116, and updates the map of the environment 101 with user 128's location.

In step 308, one or more video cameras 118 record user 128 as he moves through the secured area 106. According to an embodiment, cameras 118 send to location information system 103 information that is used to determine the user 128's position in secured area 106. For example, video camera(s) 118 may send to location information system 103 video taken of user 128 as he moves through secured area 106. Using well known techniques, location information system 103 may analyze such video information to determine and track the location of user 128 as he moves through secured area 106. For example, using well known techniques, location information system 103 analyzes such video information to identify user 128 in the frames of such video information, and to also identify other objects in secured area 106. In an embodiment, location information system 103 is programmed with the location of such other objects. Accordingly, at any point in time, location information system 103 determines the location of user 128 in secured area 106 by identifying the objects user 128 is proximate to. Location information system 103 updates the map of environment 101 with the user 128's location as he moves through secured area 106.

In step 120, user 128 enters office 106. RFID reader 122 reads the RFID tag 204 in user 128's mobile device 130. RFID reader 122 sends a signal to location information system 103 indicating that user 128's RFID tag 204 was just read. From this signal, location information system 103 determines that user 128 is in office 106, and updates the map of the environment 101 with user 128's location.

In an embodiment, RFID reader 122 may also read other information from RFID tag 204 in the user 128's mobile device 130. RFID reader 122 sends such information to location information system 103. Location information system 103 associates such other information with user 128, and displays such information adjacent to user 128's location in the map of environment 101.

In an embodiment, other information is obtained and sent to location information system 103 when RFID reader 122 reads user 128's RFID tag 204. For example, a heat sensor 124 may sense the current temperature of office 106, and forward such temperature information to location information system 103. Location information system 103 displays such temperature information in the map of environment 101, proximate to the location of user 128.

In step 312, user 128 logs into computer 126. According to an embodiment, computer 128 sends information to location information system 103, where such information indicates a log-on using user 128's password. From this information, location information system 103 determines that user 128 is located adjacent to computer 128, and updates the map of the environment 101 with the user 128's new location.

In step 314, user 128 leaves office building 104 and enters the open area 132. In an embodiment, WIFI routers 134 are positioned in area 132. These WIFI routers 134 communicate with the WIFI transceiver 206 in the user 128's mobile device 130, and send information reflecting such communication to location information system 103. Location information system 103 uses such information from WIFI routers 134 to triangulate on user 128's location in area 132, using well known techniques. For example, location information system 103 can determine the location of user 128 by analyzing the relative signal strength of mobile device 130's WIFI transceiver 206 at WIFI routers 134. This is similar to well known techniques for triangulating on the position of a cellular telephone by analyzing the telephone's signal strength at multiple cell towers. The location information system 103 updates the map of environment 101 with the user 128's location as he moves through area 132.

In step 316, user 138 uses a bar code reader 138 to gain access to warehouse 136. Bar code reader 138 reads the bar code 210 on user 128's mobile device. Assuming user 128 has proper clearance, bar code reader 138 causes door 140 to open. According to an embodiment, bar code reader 138 sends information to location information system 103 indicating that the user 128's bar code was read, and that door 140 was opened. From this information, location information system 103 concludes that user 128 is located at door 140, and updates the location of user 128 on the map of environment 101.

In step 318, the RFID reader 202 in the user 128's mobile device 130 (and/or a RFID reader that is located in the vehicle the user 128 is in, such as a forklift) reads location RFID tags 142 positioned throughout warehouse 136. Such location tags 142 may be positioned in the floor, walls, or furniture of warehouse 136, or in any other location/object of warehouse 136. RFID reader 202 notifies location information system 103 as it reads RFID tags 142. In an embodiment, RFID reader 202 may communicate with location information system 103 using WIFI transceiver 206, although any other well known communication means may alternatively be used. Since location information system 103 knows the location of location tags 142, it is able to determine the location of user 128. Accordingly, location information system 103 updates the location of user 128 on the map of environment 101 as user 128 moves through warehouse 136.

In step 320, user 128 uses the RFID reader 202 in his mobile device 130 to read the RFID tag 146 of an object 144, to retrieve information on the object 144. An adjacent location tag 142A is also read. This information is sent to location information system 103. Since location information system 103 knows the location of location tag 142A, location information system 103 can deduce the location of both user 128 and the object 144. Also, note that heat sensor 148 is adjacent to location tag 142A. When location tag 142A is read, or via other triggering mechanism (such as an alert, as described below), heat sensor 148 sends the temperature of its location to location information system 103. Accordingly, location information system 103 updates the location of user 128 and object 144, as well as the temperature of the proximate area, on the map of environment 101.

As should be apparent from the example of FIG. 1, embodiments of the invention include any combination of the following features:

Location information system employs sensors or other devices that are based on multiple positioning technologies.

Location information system determines the location and tracks objects as they move through an area of interest.

Location information system determines/deduces location of an object using information provided by sensors.

Location information system translates the location information received from sensors, that may be in the format of varying coordinate systems, to a form that is consistent with the coordinate system of the map of the environment 101. (This is described below)

Sensors provide information related to the object being tracked to the location information system. The location information system associates such information with the object.

Location information system inherently supports multiple positioning technologies. Accordingly, additional sensors can be added to any given location information system in a straightforward manner that is time and cost efficient.

These and other features of embodiments of the invention are further described below.

2. Location Information System

Structural Embodiment

Figure 4:
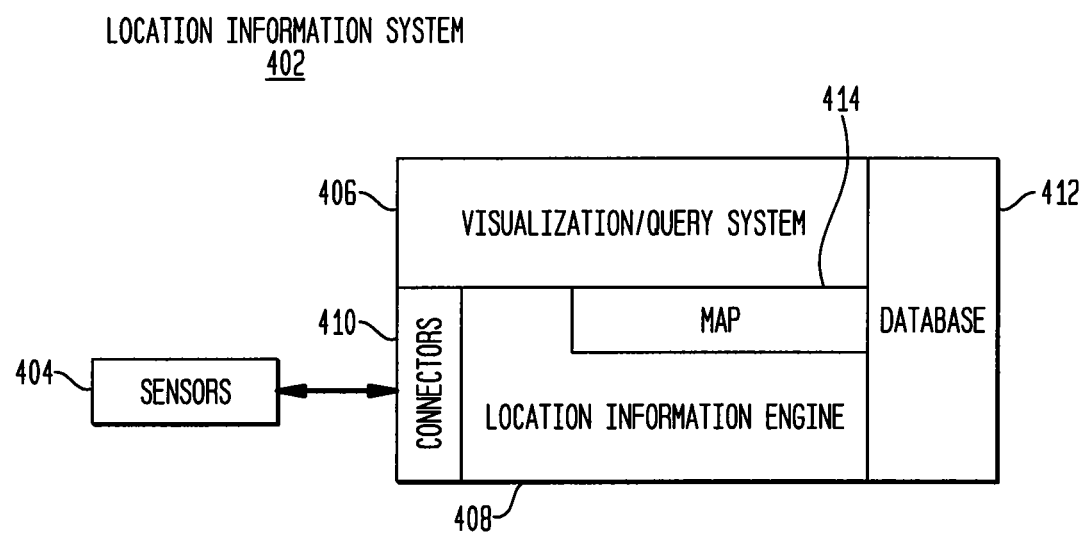
FIG. 4 is a block diagram of a location information system, according to an embodiment of the invention.

FIG. 4 is a block diagram of a location information system 402 according to an embodiment of the invention. The location information system 402 includes a visualization/query system 406, a location information engine 408, connectors 410, and database 412.

Location information system 402 operate with sensors 404. Sensors 404 are any well known devices that generate location information, such as GPS devices, radar devices, etc., or any well known devices that generate information from which location can be determined or deduced as described herein, such as RFID readers 122, card readers 110, biometric readers 114, video cameras 118, WIFI routers 134, bar code readers 138, cellular devices, etc. Sensors 404 may be based on any positioning technology. Sensors 404 may also include other devices that generate information of interest, such as heat sensors, motion sensors, moisture sensors, etc.

Location information engine 408 is coupled to sensors 404 via connectors 410. Location information engine 408 interprets the information received from sensors 404 to determine or deduce the location of objects of interest (such as user 128 in the example of FIG. 1). Location information engine 408 displays the location of such objects on a map 414 of an area of interest.

The map 414 is defined according to a coordinate system, such as the geographic coordinate system (that defines locations based on latitude, longitude, and altitude/height/depth), the spherical coordinate system (that defines locations based on the radial distance of a point from a fixed origin, the zenith angle from the positive z-axis, and the azimuth angle from the positive x-axis), the Cartesian coordinate system (that defines locations based on x, y, and z coordinates), the polar coordinate system, as well as any other well known or custom coordinate system.

Some sensors 404 (such as GPS and radar devices, and WLAN and cellular triangulation techniques) provide location information to location information engine 408. Such location information may not be in the coordinate system of the map 414. In such cases, the location information engine 408 translates such location information to the coordinate system of map 414. Algorithms and techniques for translating from one coordinate system to another are well known.

Other sensors 404 provide information from which location information engine 408 must determine or deduce location. For example, in the example of FIG. 1, card reader 110 provides information to location information engine 408 that indicates that door 112 has been opened for user 128. Since location information engine 408 knows the location of door 112, location information engine 408 determines/deduces that user 128 is located at door 112.

Similarly, when user 128 enters office 106, RFID reader 122 sends a message to location information engine 408 that it read the RFID tag 204 in user 128's mobile device 130. Since location information engine 408 knows the location of RFID reader 122, location information engine 408 determines/deduces that user 128 is located in office 106.

As described above, sensors 404 provide other information to location information engine 408. Such information may include the information read from the user's ID card by card reader 110, information read from the RFID tag 204 by RFID reader 122, information related to the user 128 provided by computer 126, information read from the bar code 210 by bar code reader 138, as well as information provided by other sensors, such as but not limited to heat sensors 124, 148. In an embodiment, location information engine 408 associates such information with the object in question (this is described further below in Section 3). In an embodiment, location information engine 408 displays such information adjacent or proximate to the associated object in the map 414.

Location information engine 408 stores the information received from sensors 404, as well as other information relating to the map 414 (such as the translated location information), in database 412.

Sensors 404 are coupled to location information engine 408 via connectors 410. Connectors 410 may be general purpose input/output ports (GPIO) or any other well known interfaces for connecting sensors 404 or other peripherals to computing devices. Connectors 410 are programmable to enable the location information engine 408 to interpret information provided by sensors 404. For example, programming for a given sensor 404 includes sufficient information to enable location information engine 408 to translate from the coordinate system of the sensor to the coordinate system of map 414. The programming of connectors 410 and adding sensors 404 to location information system 402 are described further below in Section 3.

Visualization/query system 406 represents a user interface to map 414. Through visualization/query system 406, operators may view and track objects on the map 414, as well as query the database 412 and set alarms. The visualization/query system 406 is further described in Section 3.

3. Location Information System

Operational Embodiment

Figure 5:
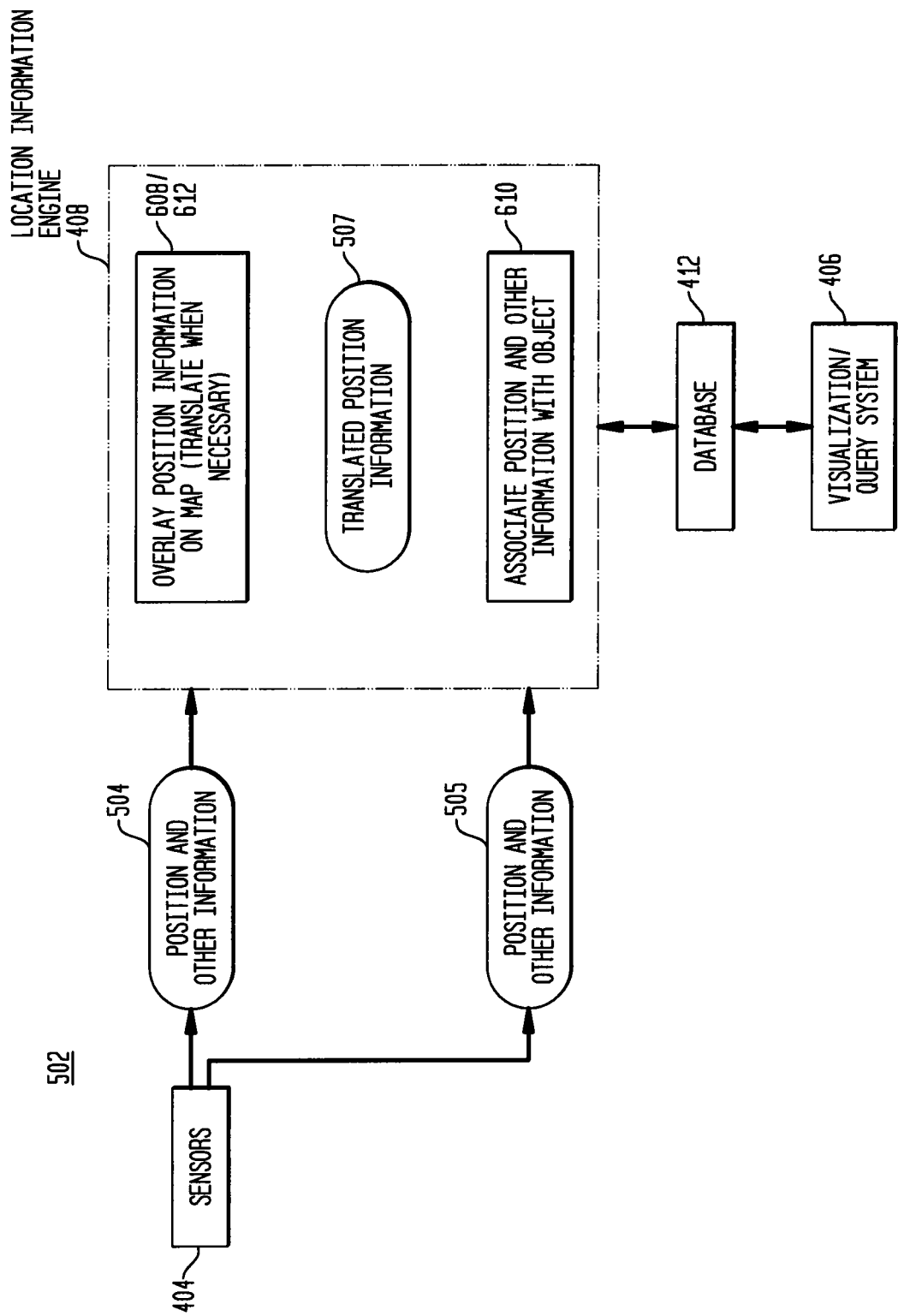
FIG. 5 is a data flow block diagram of a location information system, according to an embodiment of the invention.

An embodiment of the location information system 402 shall now be described in greater detail with reference to an example flowchart 602 illustrated in FIG. 6, and further with reference to a data flow diagram 502 shown in FIG. 5.

In step 604, sensors 404 may be added and linked to the location information system 402. As noted elsewhere herein, such sensors 404 may employ any positioning technologies. A new sensor 404 is coupled to location information system 402 via a connector 410. In an embodiment, the connector 410 comprises a physical interface to location information system 402, such as a GPIO port or any other well known computer interface. Connector 410 also comprises associated programming. As noted above, such programming enable the location information engine 408 to interpret information provided by sensors 404. For example, programming for a given sensor 404 includes sufficient information to enable location information engine 408 to translate from the coordinate system of the new sensor 404 to the coordinate system of map 414.

Figure 9:
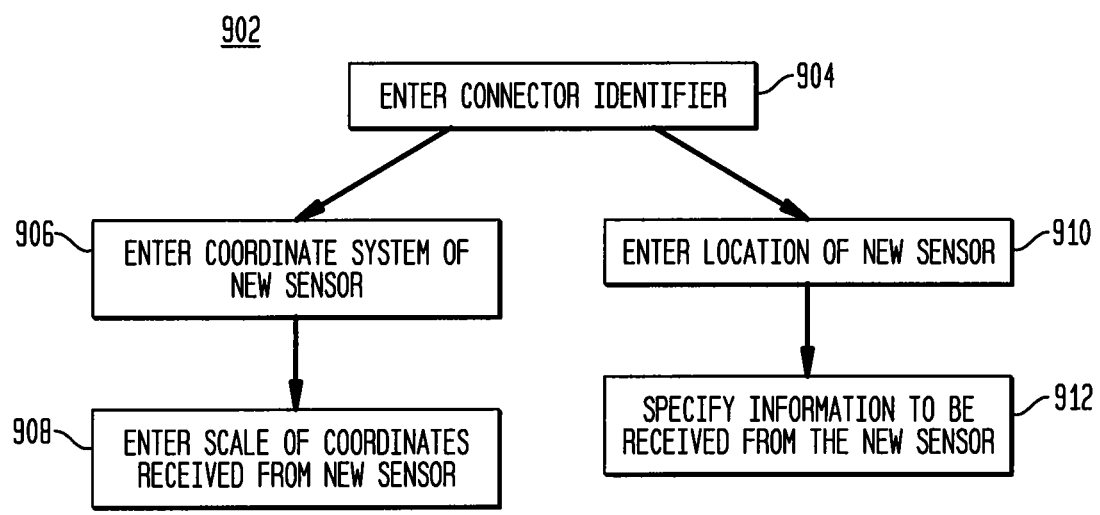
FIG. 9 illustrates a flowchart for programming a new sensor, according to an embodiment of the invention.

For example, FIG. 9 is a flowchart 902 for programming a new sensor 404 according to an embodiment of the invention. In step 904, an operator identifies a connector 410 to which the new sensor 404 will be coupled. As noted above, some sensors 404 (such as GPS and radar devices, and WLAN and cellular triangulation techniques) provide location information to location information engine 408. For those types of sensors 404, steps 906 and 908 are performed. In step 906, the operator identifies the native coordinate system of the new sensor 404. For example, the coordinate system of the new sensor 404 may be any well known coordinate system, such as the geographic coordinate system, the spherical coordinate system, the Cartesian coordinate system, the polar coordinate system, etc., or any custom coordinate system. As noted herein, well known methods, procedures and techniques exist for translating between coordinate systems. In step 908, the operator provides any additional information pertaining to the new sensor 404 that may be needed to translate from the coordinate system of the new sensor 404 to the coordinate system of map 414. For example, if the new sensor 404 has a custom coordinate system, then information defining that custom coordinate system would be provided in step 908. Alternatively, scale information may be provided in step 908. Other information provided in step 908 will be apparent to persons skilled in the relevant art(s).

As noted above, there are other sensors 404 that do not provide coordinate information. Instead, these other sensors 404 provide information from which location information engine 408 must determine or deduce location. For such sensors 404, steps 910 and 912 are performed. In step 910, the operator enters the location of the new sensor 910. For example, the coordinates of RFID reader 122 in office 106 would be provided in step 910. In step 912, the operator indicates the type of information or message that the location information engine 408 should expect to receive from the new sensor 404. For example, the operator may indicate in step 912 that the location information engine 122 will receive a RFID tag identifier when RFID reader 122 reads an RFID tag, and that location information engine 122 should associate the location of RFID reader 122 with the object associated with such received RFID tag identifier.

Referring again to FIG. 6, in step 606, sensors 404 transfer position information 504 to location information engine 408. As noted above, such position information 504 may comprise actual location coordinates from sensors 404 based on or using, for example, GPS, radar, and/or cellular/WLAN triangulation techniques. Such position information 504 may instead comprise information from which location information engine 408 determines or deduces the location of an object (for example, a signal from bar code reader 138 that it read the bar code 208 of user 128's mobile device 130, in which case location information engine 408 deduces that user 128 is located at door 140).

Sensors 404 also transfer other information 505 to location information engine 408. As described above, such additional information 505 may include information read by card reader 110 from ID cards, information read by RFID reader 122 from RFID tags 204, as well as information provided by other sensors, such as heat sensors 124 and 148.

In step 608, location information engine 408 translates the position information 504 to the coordinate system of map 414 to obtain translated position information 507. For example, the position information 504 may be expressed in terms of the geographic coordinate system (that defines locations based on latitude, longitude, and altitude/height/depth), whereas the map 414 may be expressed in terms of the Cartesian coordinate system (that defines locations based on x, y, and z coordinates). Procedures and processes for translating between coordinate systems are well known. Of course, step 608 is not performed if position information 504 is already expressed in the coordinate system of the map 414. It should be noted that reference to the geographic coordinate system and the Cartesian coordinate system is made for purposes of illustration, and not limitation. Embodiments of the invention are adapted to operate with any well known or custom coordinate system.

In step 610, location information engine 408 associates the translated position information 507 (or received position information 504) and the other information 505 with the object for which such information 504, 505 was generated. There are various methods by which location information engine 408 can associate information 504, 505, 507 with objects. For example, consider the case in FIG. 1 where computer 126 notifies location information engine 408 when user 128 logs in, and also provides to location information engine 408 other information 505 related to user 128. In an embodiment, such notification 504 and other information 505 are sent to location information engine 408 in a single message, so association inherently results. In another embodiment, such notification 504 and other information 505 are sent in multiple messages, but the messages include a common identifier, so association results from such common identification. In another embodiment, such notification 504 and other information 505 are sent in multiple messages that do not include a common identifier, but association results by noting that the messages originate from a common source (i.e., computer 126) over a short span of time. Other methods for associating information 504, 505, 507 with objects will be apparent to persons skilled in the relevant arts based on the teachings provided herein.

In step 612, location information engine 408 displays the object on the map 414, according to the translated position information 507 of the object (or, alternatively, based on the position information 504 where such position information 504 is natively expressed in terms of the coordinate system of the map 414). Other information 505 associated with the object is also displayed on the map 414. In an embodiment, such other information 505 is displayed adjacent to or otherwise proximate to the object's location in the map 414.

It is noted that the information received, processed and generated by location information system 408 is stored in database 412.

In step 614, the visualization/query system 406 enables operators to view the map 414. Visualization/query system 406 also enables operators to search the map 414, and to query the database 412. In an embodiment, queries include tabular and visual queries. A tabular query is a query that displays its search results in tabular form.

Figure 10:
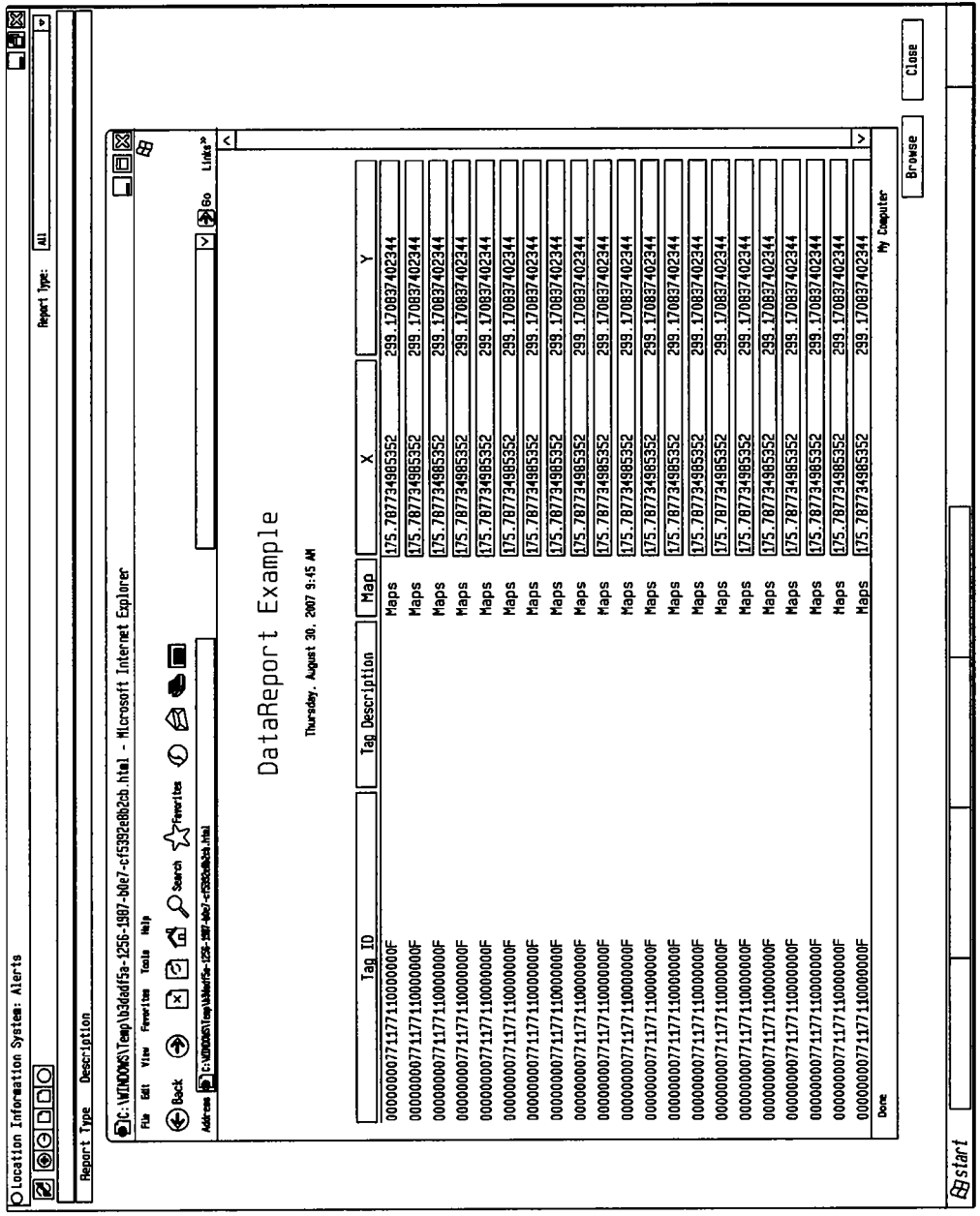
FIG. 10 illustrates an example tabular report, according to an embodiment of the invention.

Example results of a tabular query are shown in FIG. 10, where the query was "Show the locations of object associated with Tag ID=771177110000000F." As a result, the tabular results in the example of FIG. 10 indicate the X and Y coordinates of this object on map "Mapa."

A visual query is a query that displays its search results in something other than a tabular form, such as a graphical or multimedia form. For example, the query from the above example, "Show the locations of object associated with Tag ID=771177110000000F," if executed as a visual query, could result in the display of a map on which the object's positions over time are plotted.

Figure 7:
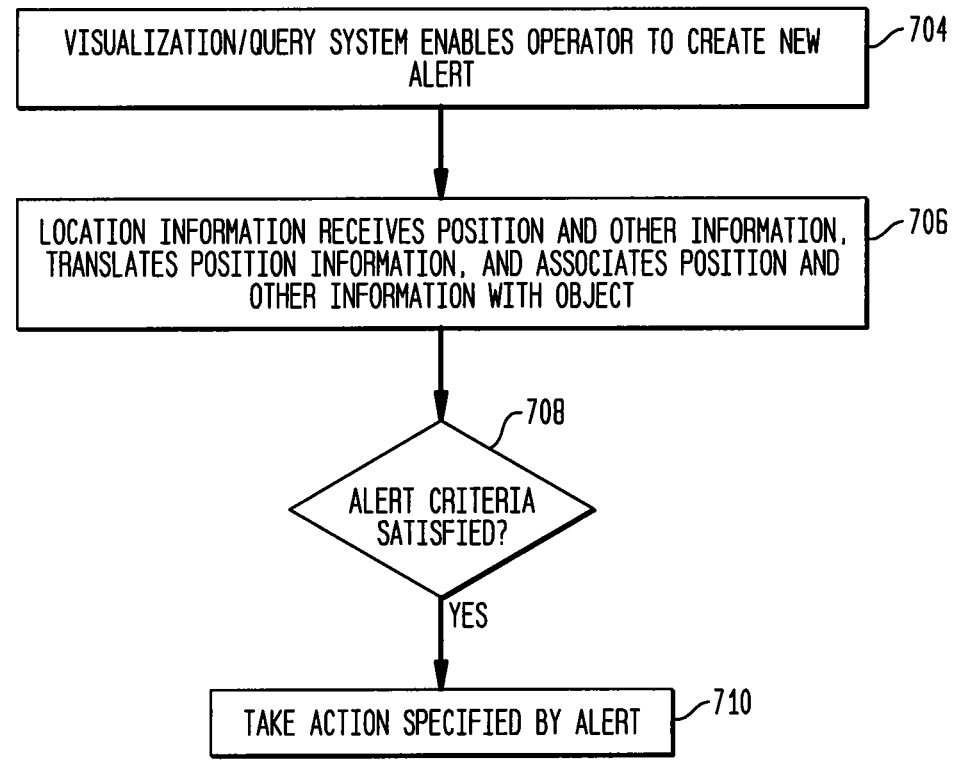
FIG. 7 is a flowchart illustrating a process for defining and processing alerts, according to an embodiment of the invention.

The visualization/query system 406 also enables operators to define alerts. FIG. 7 illustrates a flowchart 702 for defining and processing alerts, according to an embodiment of the invention.

In step 704, visualization/query system 406 enables an operator to create a new alert. Generally, an alert includes (a) a condition, and (b) an action taken if the condition is satisfied. Example alerts are shown in Table 1.

TABLE 1

Example Alerts

| Condition | Action |
|---|---|
| User 128 enters secured area 106 | Notify security |
| User 128 leaves office building 104 | Notify security |
| Someone enters office 106 | Obtain temperature reading from heat sensor 124 |
| A perishable good is found in warehouse 136 (identified by scanning the good's RFID tag) | Obtain temperature reading from heat sensor 148, and notify security if temperature is greater than 32 degrees |

Figure 11:
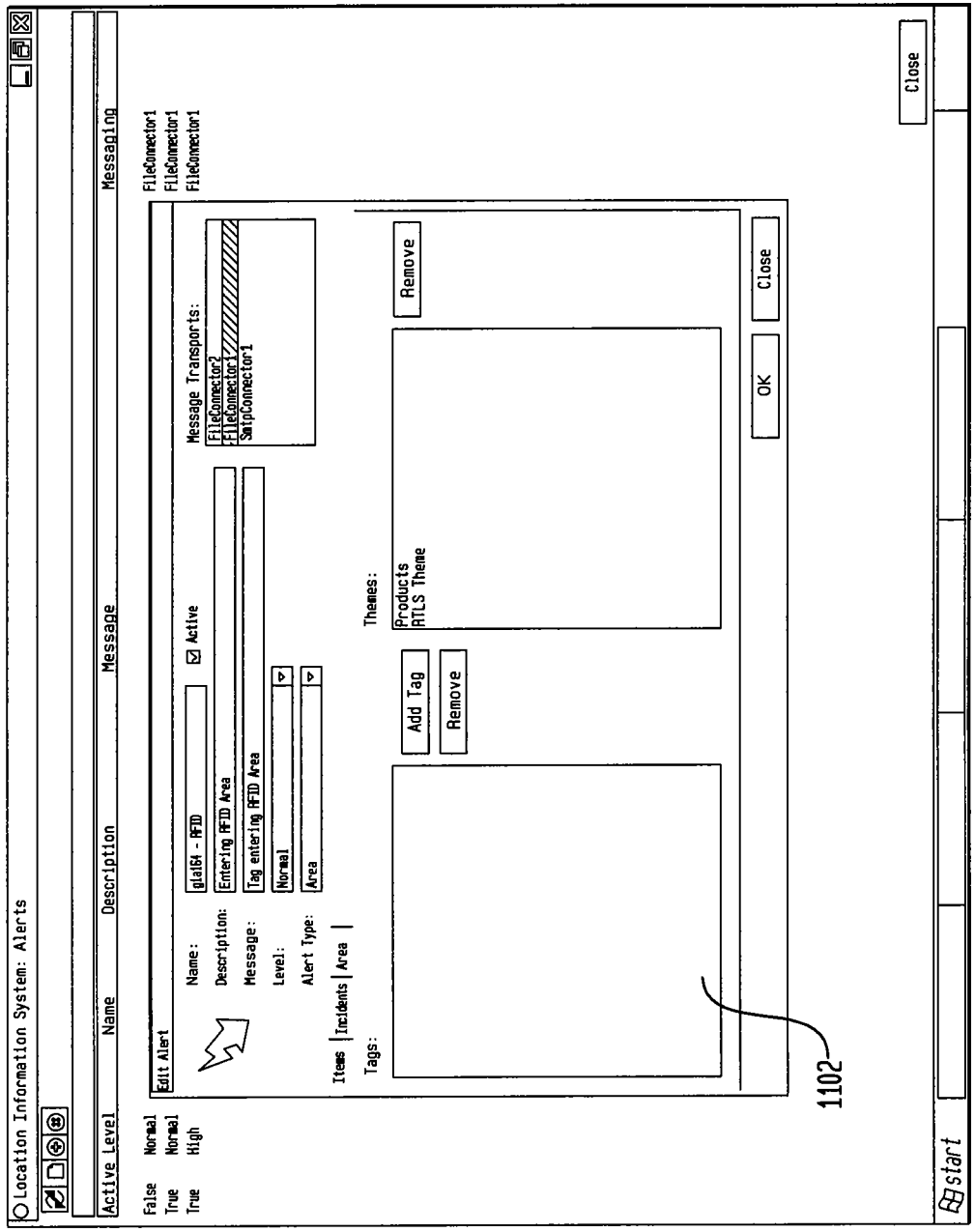
Figure 12:
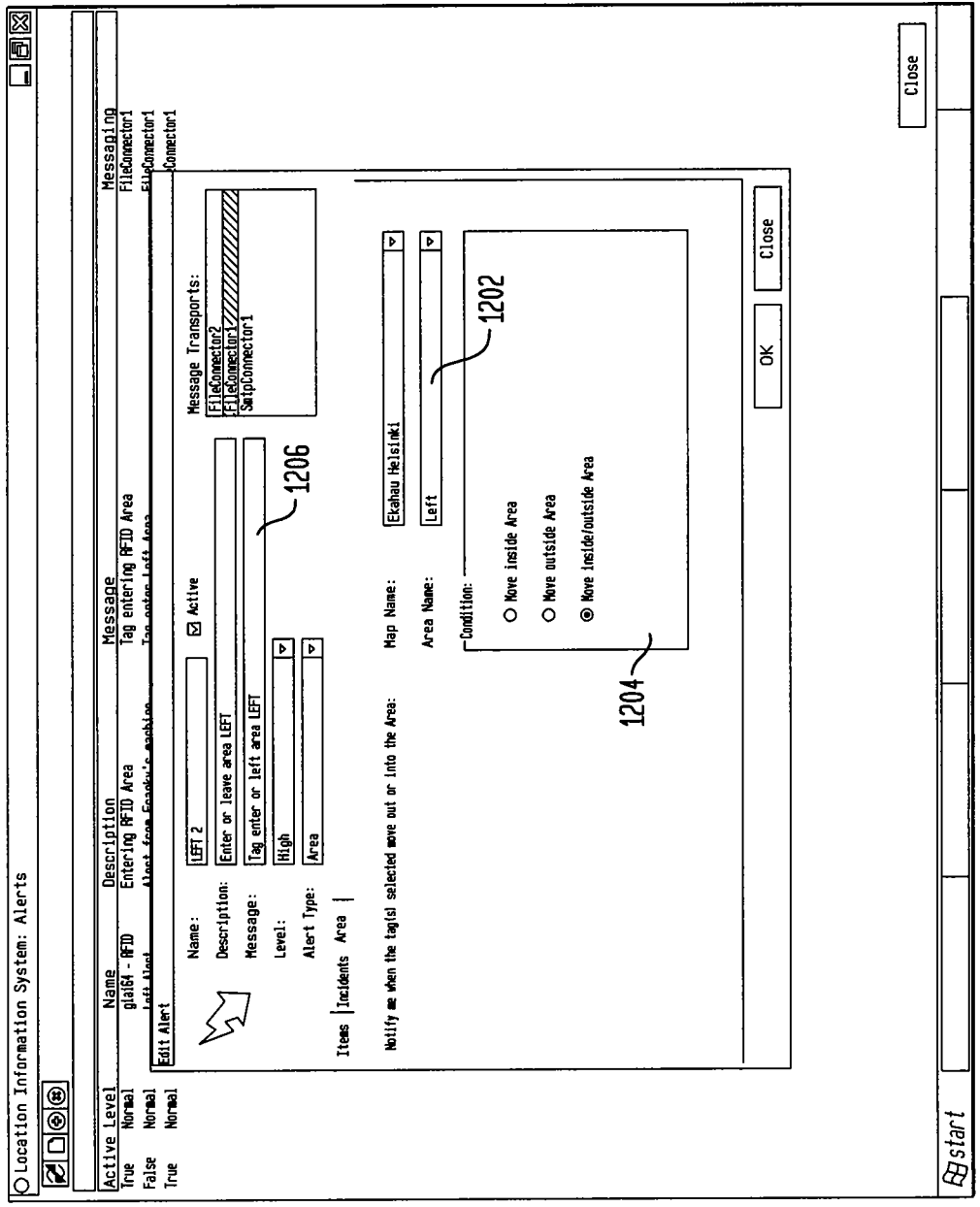
Figure 13:
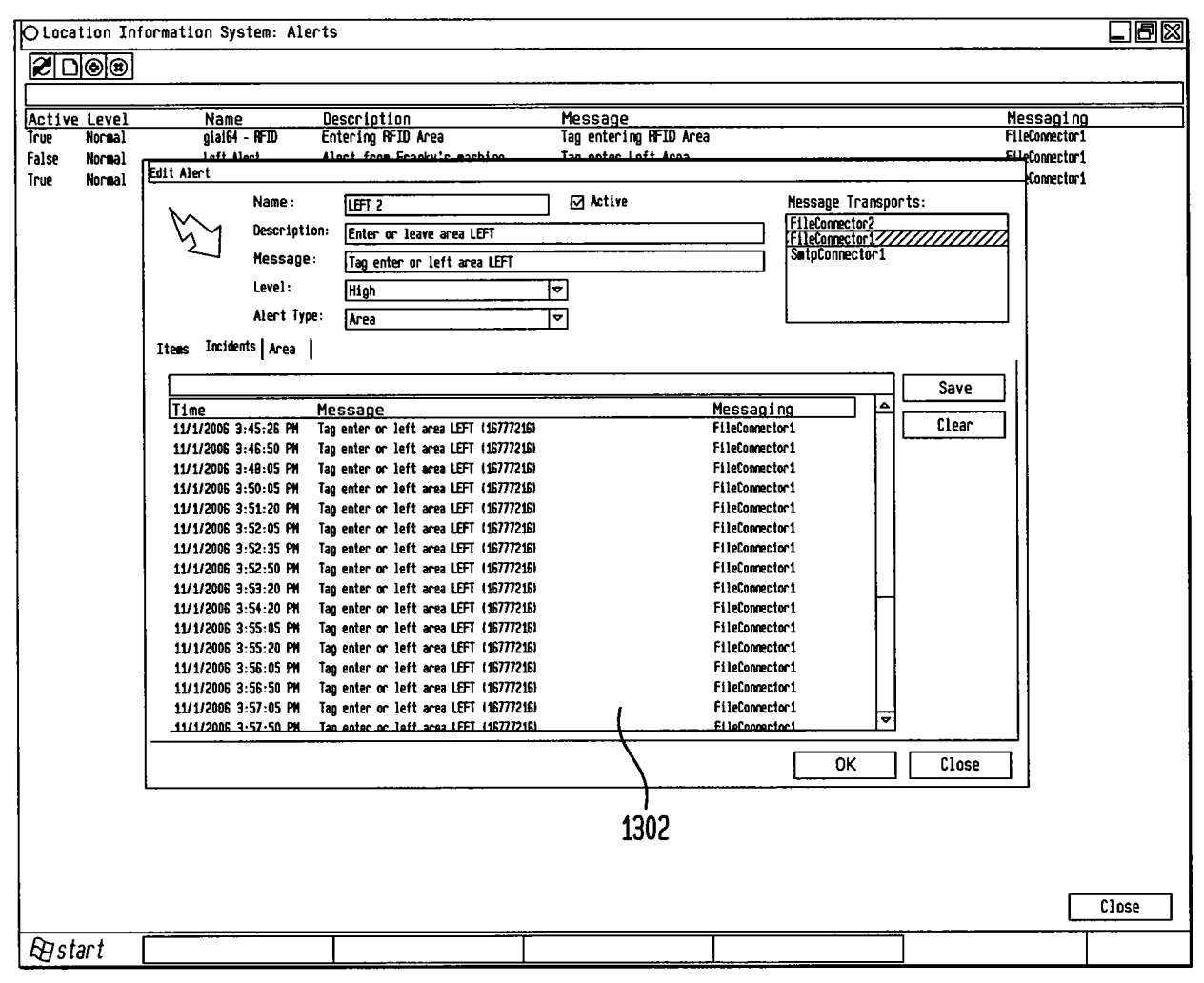

Any user interface can be used in step 704 to enable an operator to create a new alert. An example user interface for defining a new alert according to an embodiment of the invention is shown in FIGS. 11-13. According to an embodiment, an operator enters tags to be tracked in a tag window 1102 (FIG. 11). The operator could enter specific tag identifiers, or leave the tag window 1102 blank, in which case all tags will be tracked. The operator also enters the condition. In this example, the operator identifies an area "LEFT" 1202 (FIG. 12), and also indicates that the alert is triggered upon "Moving inside/outside Area" 1204. The operator also indicates the action, in this case that a Message 1206 should be displayed when the condition is satisfied. FIG. 13 illustrates an incidents report 1302 reflecting operation of the alert.

Figure 6:
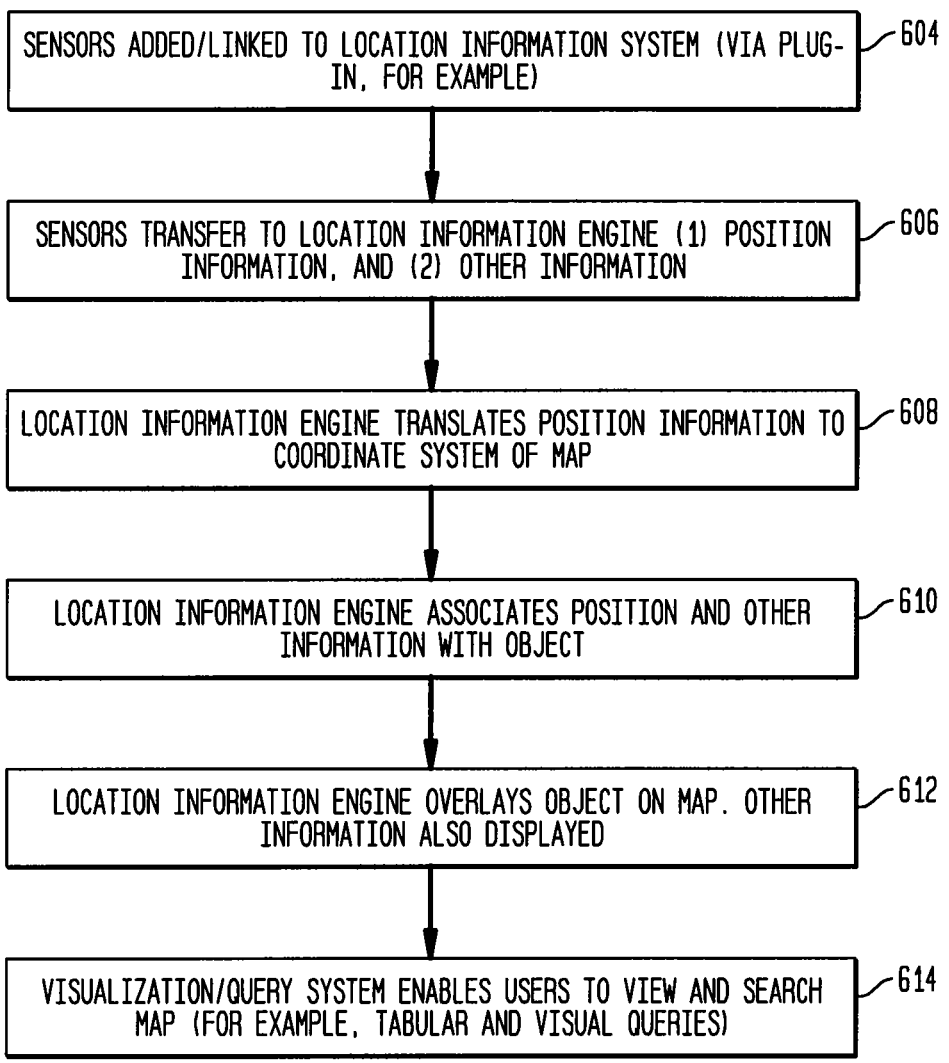
FIG. 6 is a flowchart illustrating the operation of a location information system, according to an embodiment of the invention.

In step 706, location information engine 408 receives position information 504 and other information 505 (this corresponds to step 606 in FIG. 6, described above). Location information engine 408 translates the position information 504 (this corresponds to step 608 in FIG. 6, described above), and associates the translated position information 507 and other information 505 with the object (this corresponds to step 610 in FIG. 6, described above).

In step 708, visualization/query system 406 determines whether the translated position information 507 and other information 505 satisfy the condition of any existing alert. If the condition of an alert is satisfied, then in step 710 the visualization/query system 406 causes the alert's action to be performed.

4. Example Computer Embodiment

Figure 8:
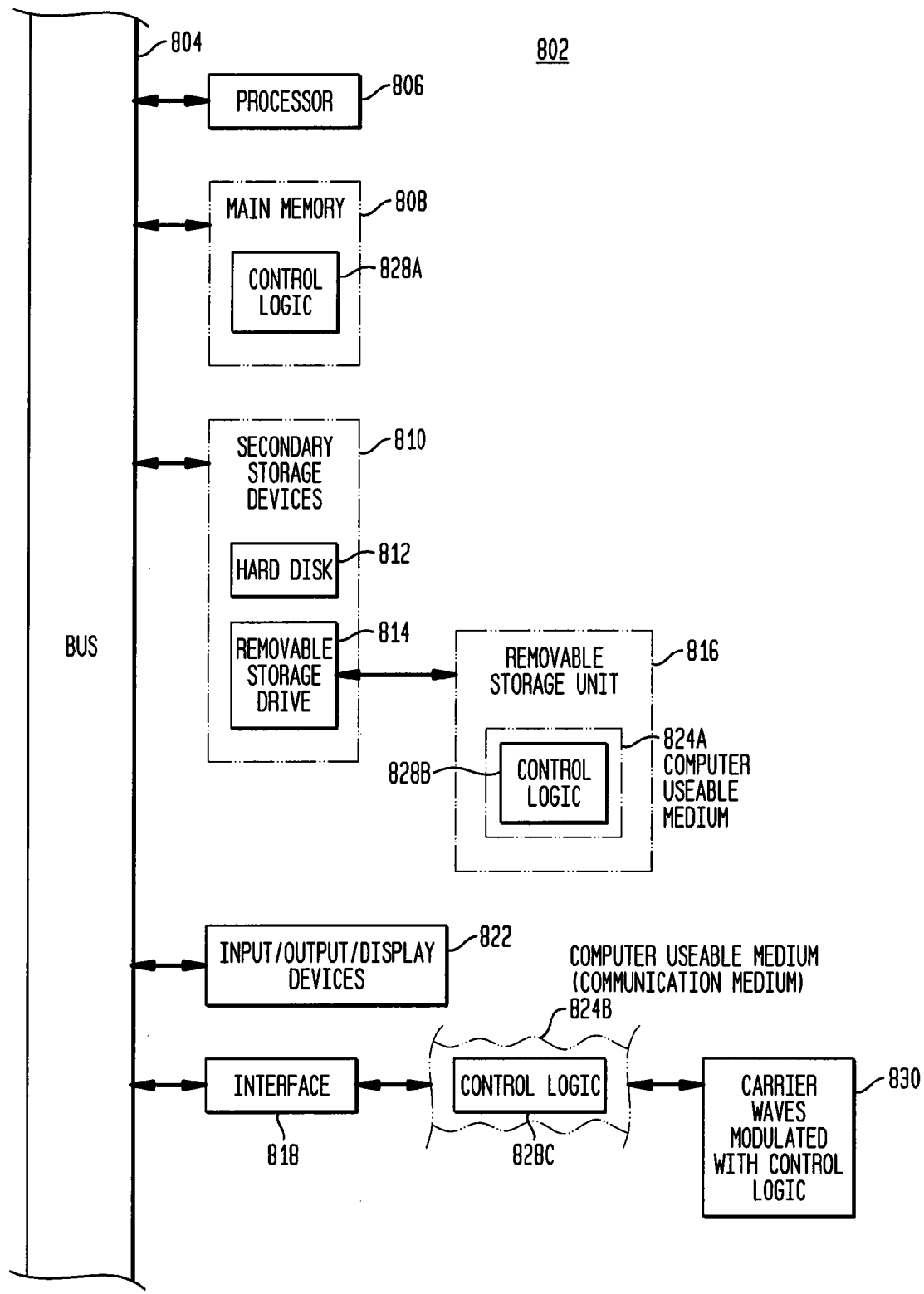
FIG. 8 illustrates an example computer useful for implementing components of the invention.

In an embodiment of the present invention, the system and components of the present invention described herein are implemented using well known computers, such as computer 802 shown in FIG. 8. For example, location information system 402 can be implemented using computer(s) 802.

The computer 802 can be any commercially available and well known computer capable of performing the functions described herein, such as computers available from International Business Machines, Apple, Sun, HP, Dell, Compaq, Digital, Cray, etc.

The computer 802 includes one or more processors (also called central processing units, or CPUs), such as a processor 806. The processor 806 is connected to a communication bus 804.

The computer 802 also includes a main or primary memory 808, such as random access memory (RAM). The primary memory 808 has stored therein control logic 828A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks.

The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 822, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from the computer 802 via the communication medium 824B. More particularly, the computer 802 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 802, the main memory 808, secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

6. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer program product including a non-transitory computer-readable medium having instructions stored thereon that, if executed by a processing device, cause the processing device to perform operations comprising:
receiving a first notification of a first event occurring at a first sensor, the first sensor being one of a plurality of different sensors positioned throughout a physical area and fixed at a first geographical location of the physical area;
determining a user is at the fixed first geographical location of the first sensor based on the received first notification;
receiving information from an environmental sensor, the environmental sensor being one of the plurality of different sensors positioned throughout the physical area and fixed at a second geographical location of the physical area, the second geographical location being different from the first geographical location, wherein the information includes a current environmental characteristic of the physical area and the second geographical location;
translating the first geographical location and the second geographical location to a coordinate system of a map;
displaying an object representing the user on the map in accordance with the translated first geographical location and relative to the translated second geographical location; and
displaying, on the map, at the first geographical location and proximate to the object representing the user on the map, information corresponding to the current environmental characteristic of the physical area.

2. The computer program product of claim 1, the operations further comprising:
receiving a second notification of a second event occurring at a second sensor, the second sensor being one of the plurality of different sensors positioned throughout the physical area and fixed at a third geographical location of the physical area;
determining the user is at the fixed third geographical location of the second sensor based on the received second notification;
translating the third geographical location to the coordinate system of the map; and
updating the object representing the user on the map in accordance with the translated third geographical location.

3. The computer program product of claim 2, the operations further comprising:
receiving from the first sensor and the second sensor other information relating to the user; and
displaying the other information on the map at the third geographical location.

4. The computer program product of claim 3, wherein the other information, the notification of the first event, and the notification of the second event are received in separate messages, the messages each including an identifier to associate the separate messages.

5. The computer program product of claim 2, wherein the first sensor is a RFID reader and the second sensor is a biometric scanner.

6. The computer program product of claim 2, the operations further comprising:
generating one or more alerts upon receipt of the notification of the first event and the notification of the second event, the alerts acting to automatically initiate one or more user-defined operations.

7. The computer program product of claim 2, the operations further comprising:
receiving a third notification of a third event occurring at a third sensor, the third sensor being one of the plurality of different sensors positioned throughout the physical area and fixed at a fourth geographical location of the physical area, the third sensor purposed to perform operations different from the first sensor and the second sensor;

determining the user is at the fixed fourth geographical location of the third sensor based on the received third notification;

translating the fourth geographical location to the coordinate system of the map; and updating the object representing the user on the map in accordance with translated the fourth geographical location.

8. The computer program product of claim 1, wherein the user has a user that is at least one of a: cellular phone; RFID card; and WIFI transceiver, wherein the user is detected by the first sensor and triggers the first event.

9. The computer program product of claim 1, wherein receiving information from the environmental sensor comprises receiving information from a sensor measuring the temperature at the first geographical location.

10. The computer program product of claim 1, wherein receiving information from the environmental sensor comprises receiving information from a sensor measuring the moisture at the first geographical location.

11. The computer program product of claim 1, further comprising generating an alert based on the current environmental characteristic of the first geographical location; and initiating a user defined operation based on the generated alert.

12. The computer program product of claim 11, wherein generating the alert based on the current environmental characteristic comprises generating an alert based on the current temperature of the first geographical location.

13. The computer program product of claim 1, further comprising:

querying the map for positional information related to the user, based on a tag identifier associated with the user; and displaying, on the map, a plot of different positions of the object and different environmental characteristics at the different positions, over a period of time.

14. The computer program product of claim 13, wherein the indication of query is received in response to a user-generated visual query or tabular query.

* * * * *